US012766805B2

(12) United States Patent
Hendricks et al.

(10) Patent No.: US 12,766,805 B2
(45) Date of Patent: Oct. 20, 2026

(54) BLANK TURNING ASSEMBLY, RELATED SYSTEMS AND METHODS

(71) Applicant: Graphic Packaging International, LLC, Atlanta, GA (US)

(72) Inventors: Timothy W. Hendricks, Acworth, GA (US); Pete Karst, Canton, GA (US); Kevin T. May, Kennesaw, GA (US); Ryan Dye, Marietta, GA (US); Carlos Molina Pena, Atlanta, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 10 days.

(21) Appl. No.: 18/987,861

(22) Filed: Dec. 19, 2024

(65) Prior Publication Data

US 2025/0205987 A1 Jun. 26, 2025

Related U.S. Application Data

(60) Provisional application No. 63/612,683, filed on Dec. 20, 2023.

(51) Int. Cl.
*B31B 50/04* (2017.01)
*B65H 5/02* (2006.01)
(Continued)

(52) U.S. Cl.
CPC .......... *B31B 50/046* (2017.08); *B65H 5/023* (2013.01); *B65H 5/085* (2013.01); *B65H 5/18* (2013.01);
(Continued)

(58) Field of Classification Search
CPC ...... B65H 2701/176; B65H 2701/1762; B65H 2701/1764; B65H 2701/1766; B65H 5/18;
(Continued)

(56) References Cited

U.S. PATENT DOCUMENTS 4,411,350 A * 10/1983 Wolfram ................ B65G 13/00
198/417
5,356,508 A 10/1994 Watanabe
(Continued)

FOREIGN PATENT DOCUMENTS

AU 2024404907 A1 5/2026
CA 2669065 A1 5/2008
(Continued)

OTHER PUBLICATIONS

International Search Report and Written Opinion for PCT/US2024/061011 dated Apr. 9, 2025.

*Primary Examiner* — Jeremy R Severson
(74) *Attorney, Agent, or Firm* — Andrew N. Claerbout; FisherBroyles, LLP

(57) ABSTRACT

A method of moving a blank in a product packaging system, the method including positioning the blank on a blank feeding assembly, the blank feeding assembly defining a first machine direction, advancing the blank from the blank feeding assembly toward a product conveyor assembly configured to move at least one product in a second machine direction, the second machine direction offset from the first machine direction, and moving the blank along a blank turning assembly, the blank turning assembly having a plurality of turning rails following at least one of a curved path and an angled path between the blank feeding assembly and the product conveyor assembly.

23 Claims, 16 Drawing Sheets

(51) Int. Cl.
*B65H 5/08* (2006.01)
*B65H 5/18* (2006.01)

(52) U.S. Cl.
CPC .. *B65H 2701/1764* (2013.01); *B65H 2801/81* (2013.01)

(58) Field of Classification Search
CPC . B65H 5/085; B65H 5/08; B65H 5/38; B65H 2301/44716; B65H 2301/44722; B65H 2404/61; B65H 2404/6111; B65H 2404/6112; B65H 2404/7431; B65H 5/16; B65H 5/36; B65H 2404/1541; B65H 2404/154; B65H 2404/74; B65H 2404/73; B65H 2404/731; B65H 2404/7312; B65H 2404/732; B65H 2404/733; B65H 5/10; B31B 50/046; B31B 50/04; B31B 50/07; B65G 13/08; B65G 13/10
See application file for complete search history.

(56) References Cited

U.S. PATENT DOCUMENTS

| | | | | | |
|---|---|---|---|---|---|
| 5,456,178 | A | * | 10/1995 | Henn .................. | B65H 29/241 101/409 |
| 5,715,657 | A | | 2/1998 | Mondani et al. | |
| 6,000,528 | A | | 12/1999 | Van Maanen | |
| 7,146,784 | B1 | | 12/2006 | Portrait | |
| 9,403,611 | B2 | | 8/2016 | Sacchetti | |
| 10,647,457 | B2 | | 5/2020 | Hutter | |
| 12,138,885 | B2 | | 11/2024 | Ford | |
| 12,258,163 | B2 | | 3/2025 | Ponti | |
| 12,459,224 | B2 | | 11/2025 | Walsh | |
| 12,521,956 | B2 | | 1/2026 | Lucy | |
| 2003/0000182 | A1 | | 1/2003 | Portrait | |
| 2005/0079966 | A1 | | 4/2005 | Moshier | |
| 2015/0183592 | A1 | | 7/2015 | Guernsey | |
| 2018/0202855 | A1 | | 7/2018 | Guernsey | |
| 2025/0026573 | A1 | | 1/2025 | Hendricks | |
| 2025/0026587 | A1 | | 1/2025 | Dye | |
| 2025/0353628 | A1 | | 11/2025 | Hendricks | |

FOREIGN PATENT DOCUMENTS

| | | | |
|---|---|---|---|
| CN | 114466796 | B | 4/2024 |
| EP | 0 440 940 | A1 | 8/1991 |
| EP | 0471450 | B1 | 5/1995 |
| EP | 0623511 | B1 | 6/1997 |
| EP | 0608103 | B1 | 7/1998 |
| EP | 1047595 | B1 | 9/2003 |
| EP | 1240082 | B1 | 3/2004 |
| EP | 3746365 | B1 | 4/2025 |
| EP | 4310027 | B1 | 8/2025 |
| EP | 4719756 | A1 | 4/2026 |
| HK | 40077016 | A | 2/2023 |
| HK | 40077019 | A | 2/2023 |
| JP | H11502802 | A | 3/1999 |
| JP | 3837436 | B2 | 10/2006 |
| JP | 2015-199525 | A | 11/2015 |
| JP | 2019026353 | A | 2/2019 |
| JP | 6641431 | B2 | 2/2020 |
| JP | 7657799 | B2 | 4/2025 |
| KR | 10-2185729 | B1 | 12/2020 |
| KR | 102893263 | B1 | 12/2025 |
| MX | 2008015536 | A | 12/2008 |
| WO | 2005044700 | A1 | 5/2005 |
| WO | 2025019735 | A1 | 1/2025 |

* cited by examiner

100

BLANK TURNING ASSEMBLY, RELATED SYSTEMS AND METHODS

CROSS-REFERENCE TO RELATED APPLICATION

The present application claims the benefit of U.S. Provisional Patent Application No. 63/612,683, filed on Dec. 20, 2023.

INCORPORATION BY REFERENCE

The disclosure of U.S. Provisional Patent Application No. 63/612,683, filed on Dec. 20, 2023, is hereby incorporated by reference for all purposes as if set forth in its entirety.

BACKGROUND OF THE DISCLOSURE

The present disclosure generally relates to blank turning assemblies, and methods and systems related thereto, for at least partially moving and/or diverting products into a machine path.

SUMMARY OF THE DISCLOSURE

According to one aspect, the disclosure is generally directed to a method of moving a blank in a product packaging system, the method comprising positioning the blank on a blank feeding assembly, the blank feeding assembly defining a first machine direction, advancing the blank from the blank feeding assembly toward a product conveyor assembly configured to move at least one product in a second machine direction, the second machine direction offset from the first machine direction, and moving the blank along a blank turning assembly, the blank turning assembly comprising a plurality of turning rails following at least one of a curved path and an angled path between the blank feeding assembly and the product conveyor assembly.

According to another aspect, the disclosure is generally directed to a product packaging system, the system comprising a blank feeding assembly defining a first machine direction;

a product conveyor assembly configured to move at least one product in a second machine direction, the second machine direction offset from the first machine direction, and a blank turning assembly, the blank turning assembly comprising a plurality of turning rails for supporting a blank and following at least one of a curved path and an angled path between the blank feeding assembly and the product conveyor assembly for moving a blank from a path along the first machine direction to a path along the second machine direction.

According to another aspect, the disclosure is generally directed to a blank turning assembly for a product packaging system, the blank turning assembly comprising a plurality of turning rails following at least one of a curved path and an angled path, the plurality of turning rails being for being positioned between a blank feeding assembly defining a first machine direction and a product conveyor assembly defining a second machine direction offset from the first machine direction such that the plurality of turning rails are for supporting and moving a blank from a path along the first machine direction to a path along the second machine direction.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to blank turning assemblies, and related systems and methods, for moving one or more blanks through a product packaging system. Products described herein can include packages including one or more articles such as food and/or beverage products. In this regard, products described herein can relate to cartons, carriers, trays, other constructs, blanks for forming the same, etc., containing one or more articles, for example containers such as beverage cans or bottles. Such containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Products according to the present disclosure can include containers of numerous different shapes. In this specification, the terms “lower,” “bottom,” “upper” and “top” indicate orientations determined in relation to fully erected products holding containers.

Figure 1:
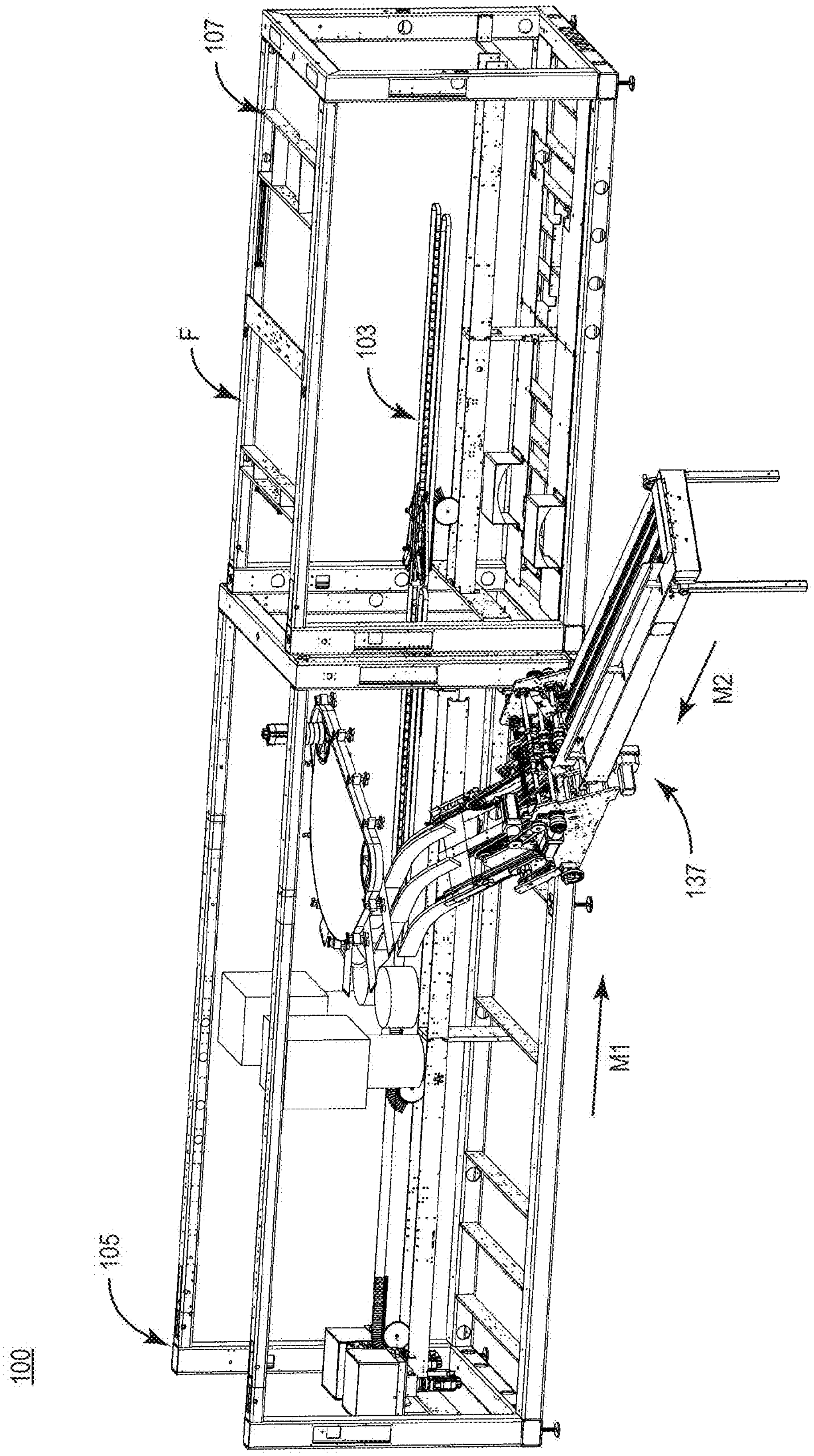
FIG. 1 is a perspective view of a product packaging system and method including a blank turning assembly according to an exemplary embodiment of the disclosure.

FIG. 1 is a perspective view of a portion of a product packaging system 100 that includes as least one product engagement assembly or product conveyor assembly 103 for engaging and/or moving one or more products therealong. As described herein, the at least one conveyor assembly 103 can be a portion of the system 100 for moving one or more products in a downstream or machine direction M1 (broadly, “second machine direction”) that at least partially extends away from an upstream portion or upstream 105 end of the system 100 toward a downstream portion or downstream end 107 of the system 100.

In this regard, the conveyor assembly 103 can be configured to move one or more products in the machine direction M1, for example, from an upstream station or component of the system 100. In the illustrated embodiment, the upstream station of component of the system 100 can be a blank feeding assembly 137, though it will be understood that one or more intermediate stations or components can be provided between the blank feeding assembly 137 and the conveyor assembly 103 without departing from the disclosure.

Furthermore, the conveyor assembly 103 can be configured to move the one or more blanks/constructs in the machine direction M1 toward a downstream station or component of the system 100, for example, one or more of blank processing assemblies (such as folding assemblies, gluing assemblies), product loading assemblies, product grouping assemblies, product metering assemblies, construct and/or product wrapping stations, turner and/or divider stations, etc. In some embodiments, a downstream end of the system 100 can be at least partially defined by a portion of the conveyor assembly 103.

The system 100 can include a machine frame F supporting at least the conveyor assembly 103, as well as various components thereof described herein. The frame F can include one or more of bases, legs, struts, tie bars, platforms, etc., in various arrangements, to provide a supporting structure for the assemblies and components described herein. For example, the machine frame F can support such components above a base surface such as a ground or floor, and can provide access at one or more locations for human operators, e.g., to inspect, maintain, and/or otherwise operate the system 100. In one embodiment, the system 100 can be provided without an external frame.

Figure 2:
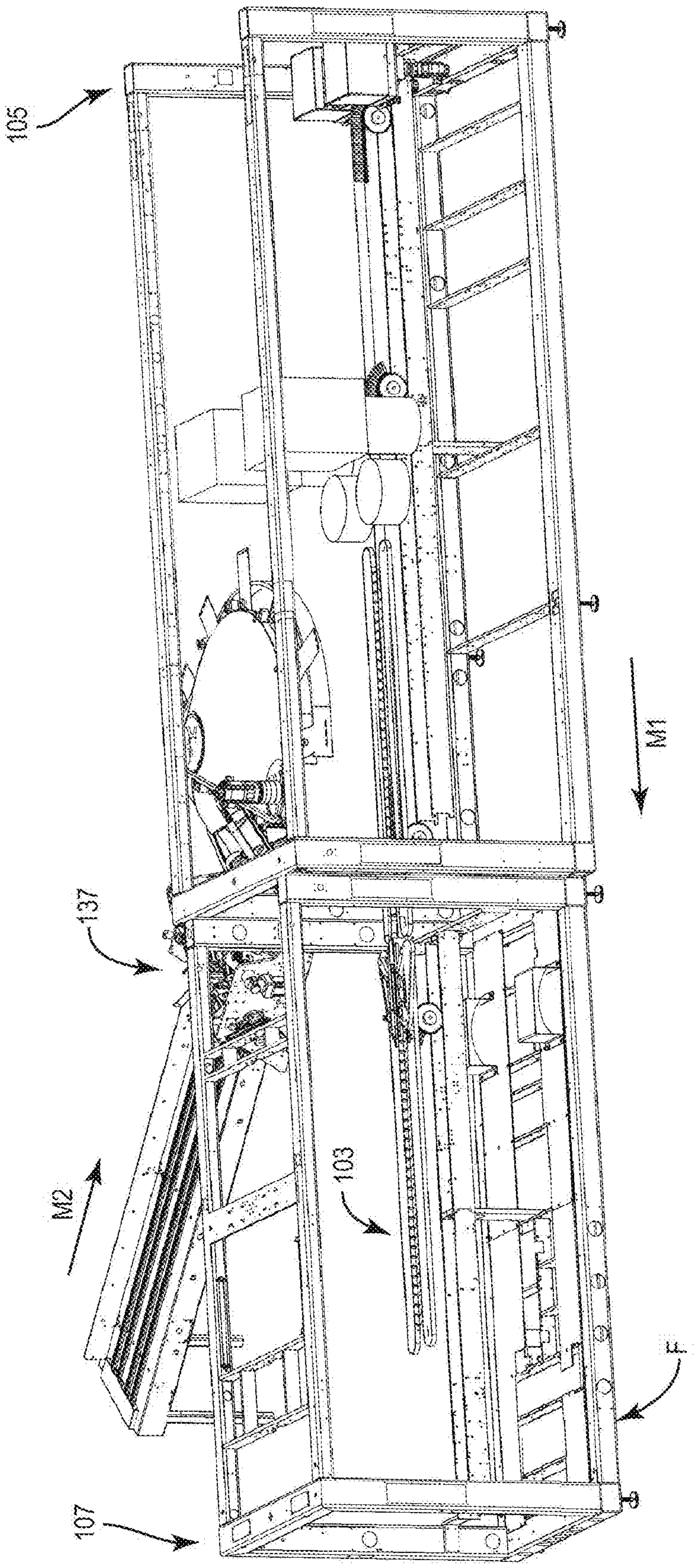
FIG. 2 is another perspective view of the system and method of FIG. 1.
Figure 3:
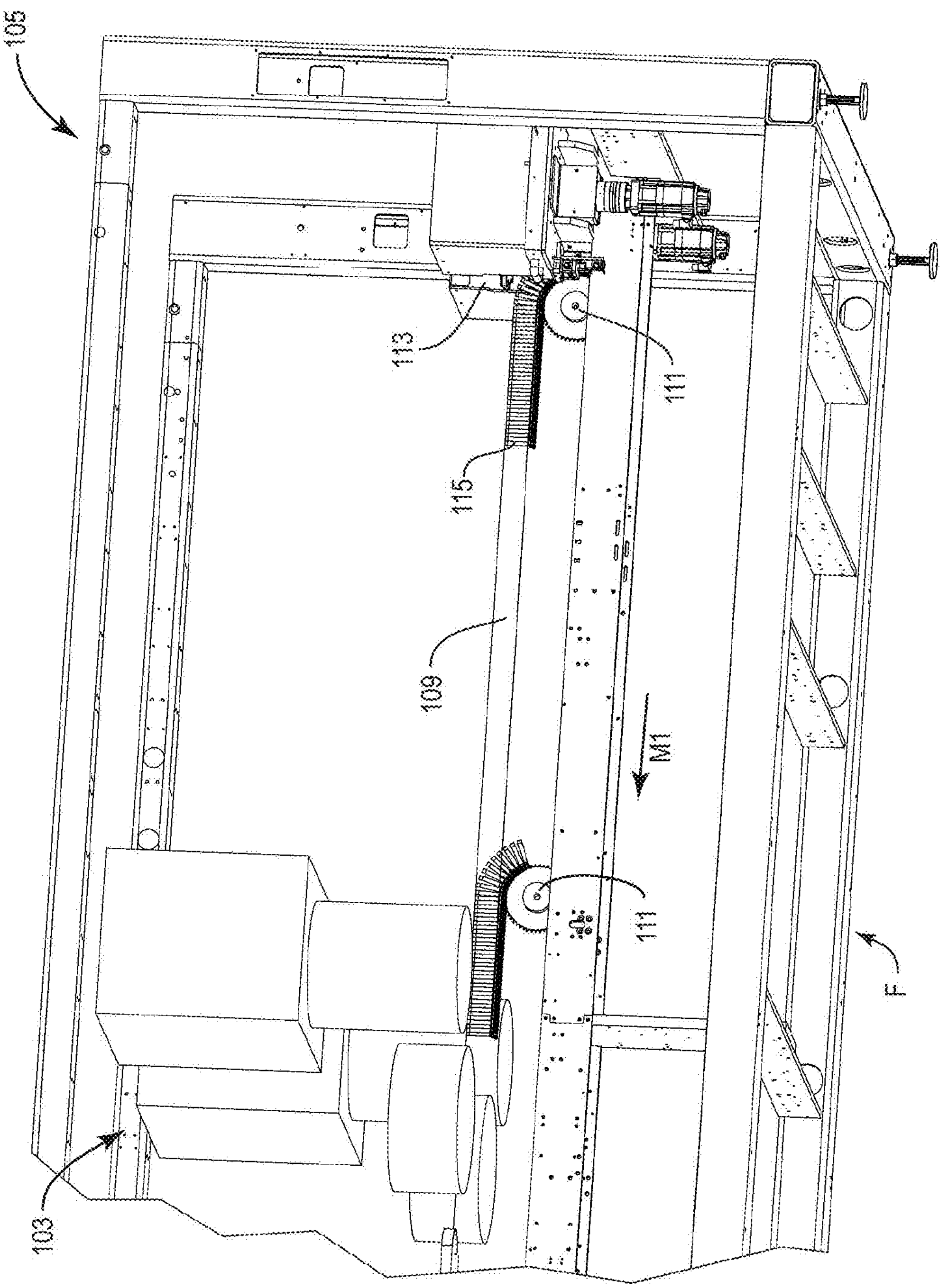
FIG. 3 is an enlarged view of a portion of the system and method of FIG. 1 that includes a portion of a product conveyor assembly.

With reference to FIGS. 1-3, the product conveyor assembly 103 can include one or more product moving belts 109 arranged extending along the machine direction M1. The product moving belts 109 can have a generally elongate configuration, e.g., so as to be formed of one or more of bands, belts, plates, rods, etc. It will be understood that the product moving belts 109 can be continuous members, or can be formed of multiple jointed segments. In some embodiments, the product moving belts 109 can be formed of a stretchable material, e.g., an elastomeric material or otherwise elastically deformable and/or resilient material.

In the illustrated embodiments, product moving belts 109 can be looped, e.g., in an elliptical fashion, about respective pairs of sprockets 111 that are rotatably mounted to the frame For an intermediate structure. In this regard, one or more drive assemblies 113, e.g., prime movers such as engines, motors, pneumatic or hydraulic systems, other actuators, etc., coupled directly or indirectly to one or more of the sprockets 111, e.g., via a mechanical transmission, can be activated to cause the sprockets 111 to rotate such that an upper portion of the respective product moving belts 109 can move in the machine direction M1.

In this regard, and as shown, the respective product moving belts 109 can carry thereupon a respective plurality of product engaging members 115, e.g., lugs, fingers, etc., arranged extending away from the respective product moving belts 109, such that along an upper path of movement of the respective product moving belts 109 in the machine direction M1, the respective product engaging members 115 can be positioned in a generally upright arrangement. While the product engaging members 115 are schematically illustrated extending partially between sprockets 111, it will be understood that the product engaging members 115 can be carried on the product moving belts 109 along a generally continuous path in the machine direction M1.

Accordingly, the product conveyor assembly 103 can include one or more belts, slats, rails, bedplates, etc., along which products can be carried or moved and along which or beside which the respective product engaging members 115 can be brought into contact with respective products to move the respective products in the machine direction M1.

Figure 4:
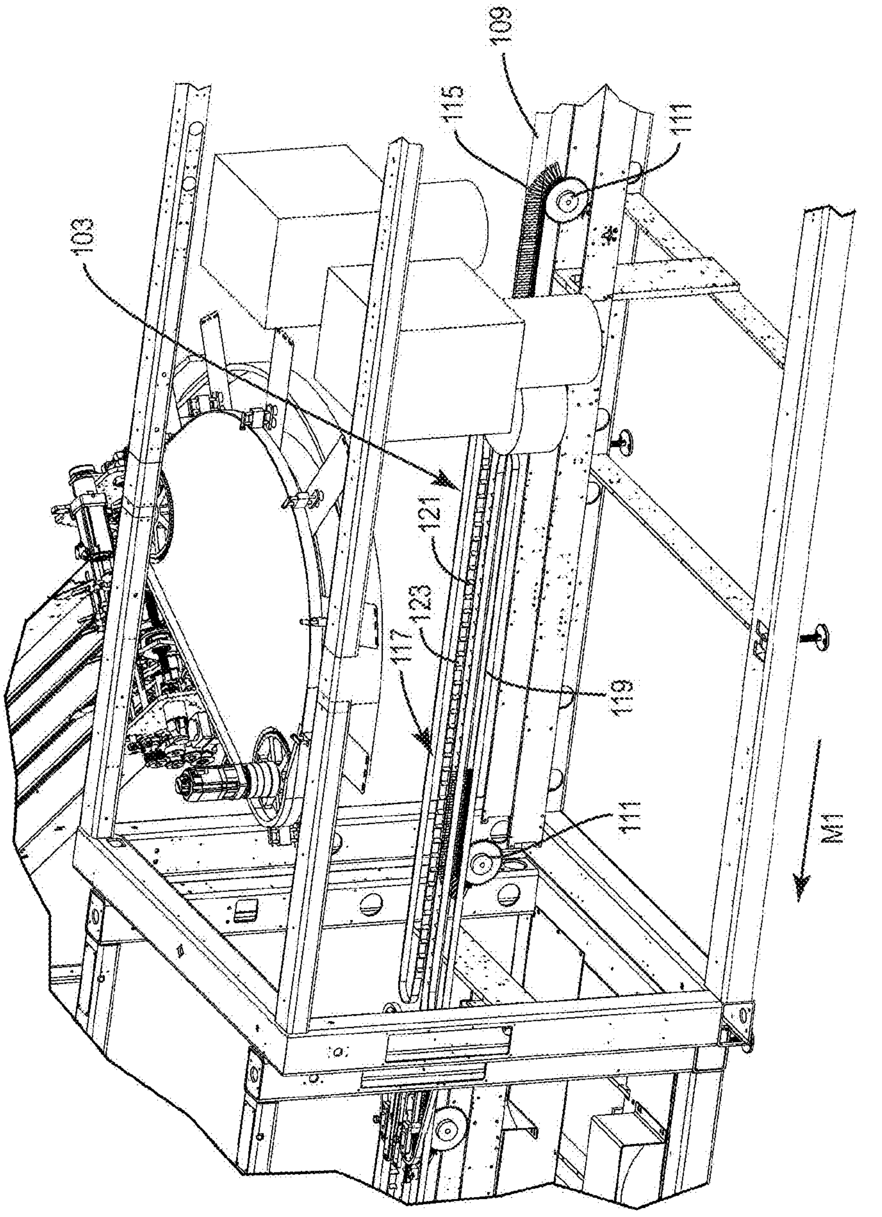
FIG. 4 is another enlarged view of a portion of the system and method of FIG. 1 that includes a portion of the product conveyor assembly.
Figure 5:
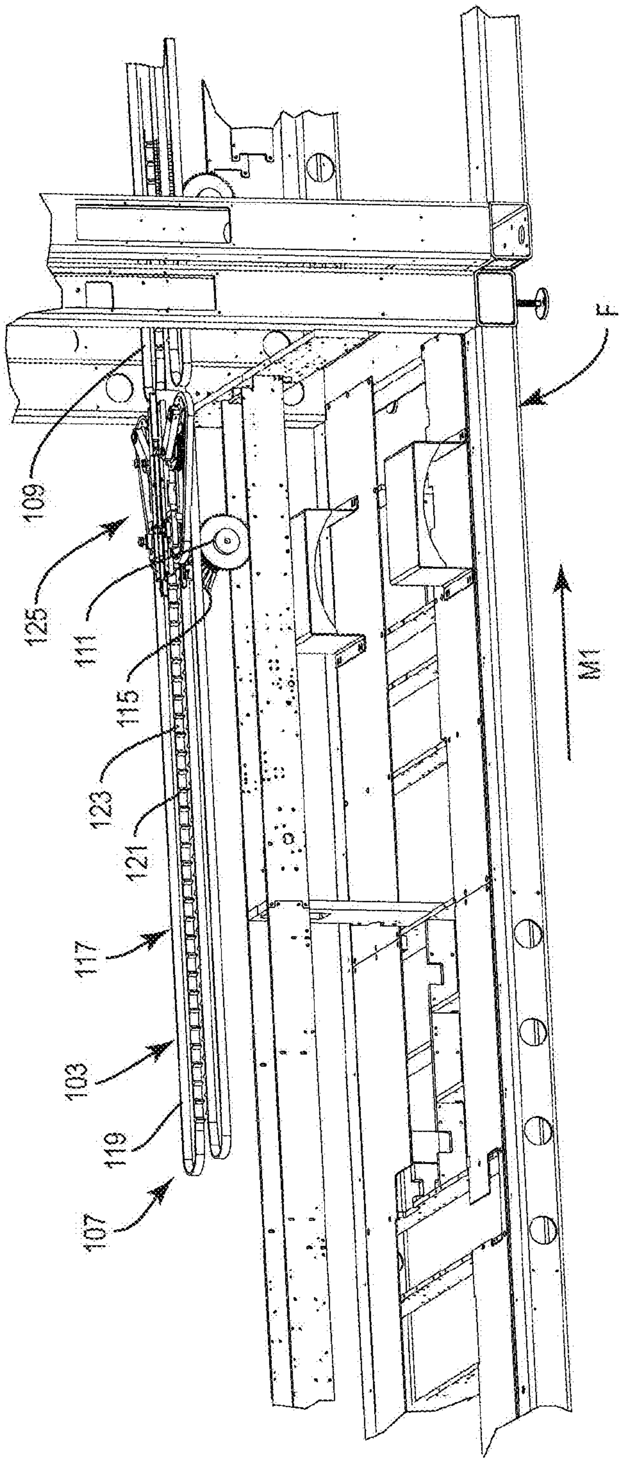
FIG. 5 is an enlarged view of a portion of the system and method of FIG. 1 including a product grouping station.

With additional reference to FIGS. 4 and 5, pairs of opposed metering belts 117 can be arranged along the product conveyor assembly 103 in the machine direction M1. The metering belts 117 can have a generally elongate configuration, e.g., bands, belts, plates, rods, etc. It will be understood that the product metering belts 117 can be continuous members, or can be formed of multiple jointed segments. In some embodiments, the metering belts 117 can be formed of a stretchable material, e.g., an elastomeric material or otherwise elastically deformable and/or resilient material.

The metering belts 117 can have a body 119 along which a plurality of metering tabs 121 protrude such that product recesses 123 are at least partially defined between adjacent metering tabs 121. In some embodiments, metering belts 117 that are at least partially coextensive along the product conveyor assembly 103 can together define respective product receiving spaces between adjacent and generally aligned product recesses 123.

The product recesses 123 can be configured to at least partially receive and position a product, e.g., a beverage container, therein. In some embodiments, spacing between product recesses 123 along a given metering belt 117 can correspond to a desired spacing of adjacent products in the machine direction M1. In some embodiments, the metering belts 117 can be driven to move products in the machine direction M1 independent of or in concert with the product engaging members 115 described above.

In the illustrated embodiments, metering belts 117 can be looped, e.g., in an elliptical fashion, about respective gears or sprockets that are rotatably mounted to the frame F or an intermediate structure. In this regard, one or more drive assemblies can be activated to cause the metering belts 117 to rotate such that facing portions of adjacent metering belts 117 can move in the machine direction M1.

The product conveyor assembly 103 can also include a product grouping station 125 positioned toward the downstream end thereof. The product grouping station 125, as shown, can include a pair of opposed product grouping assemblies 127.

Figure 6:
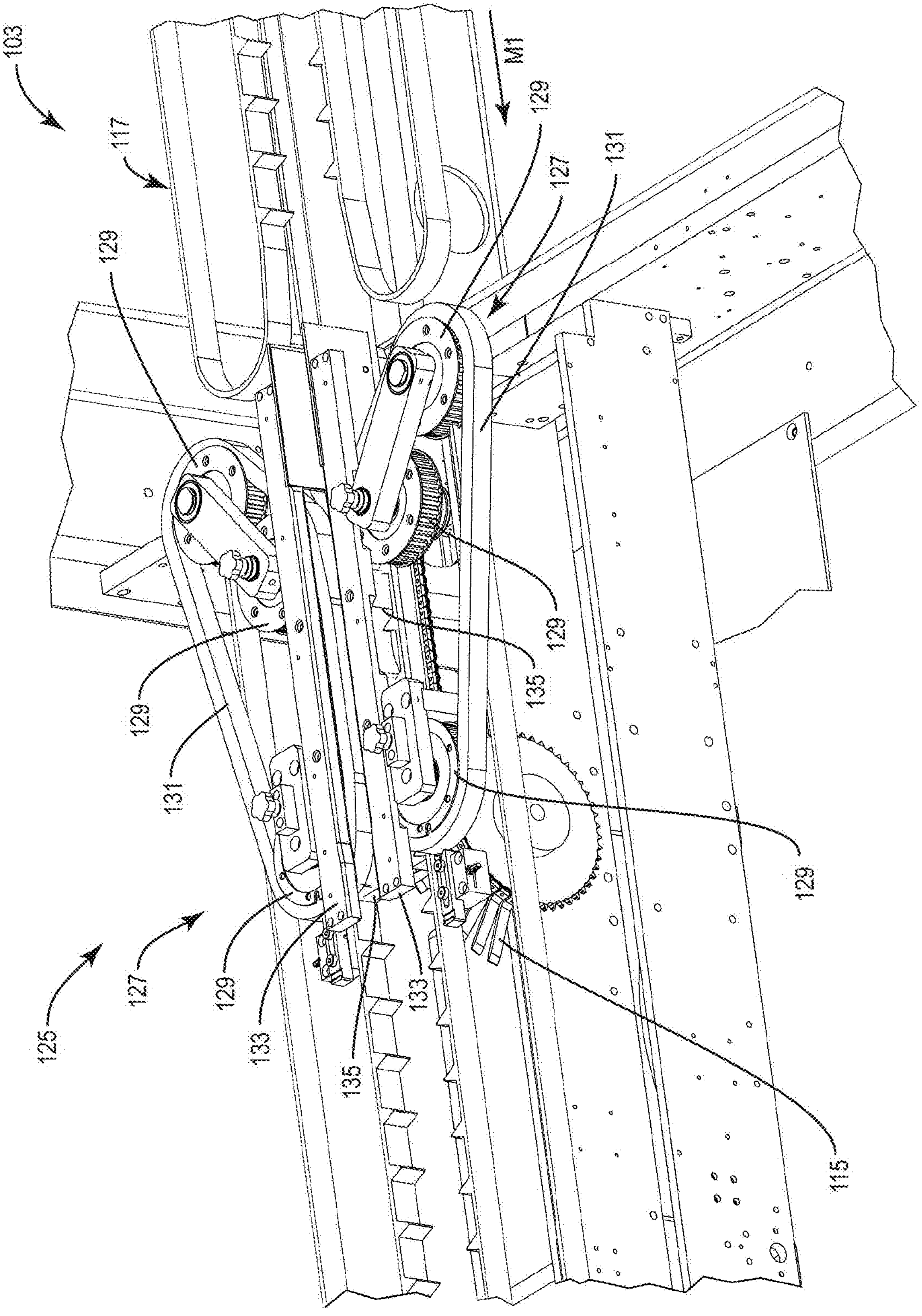
FIG. 6 is a further enlarged view of the portion of the system and method of FIG. 1 including the product grouping station.
Figure 7:
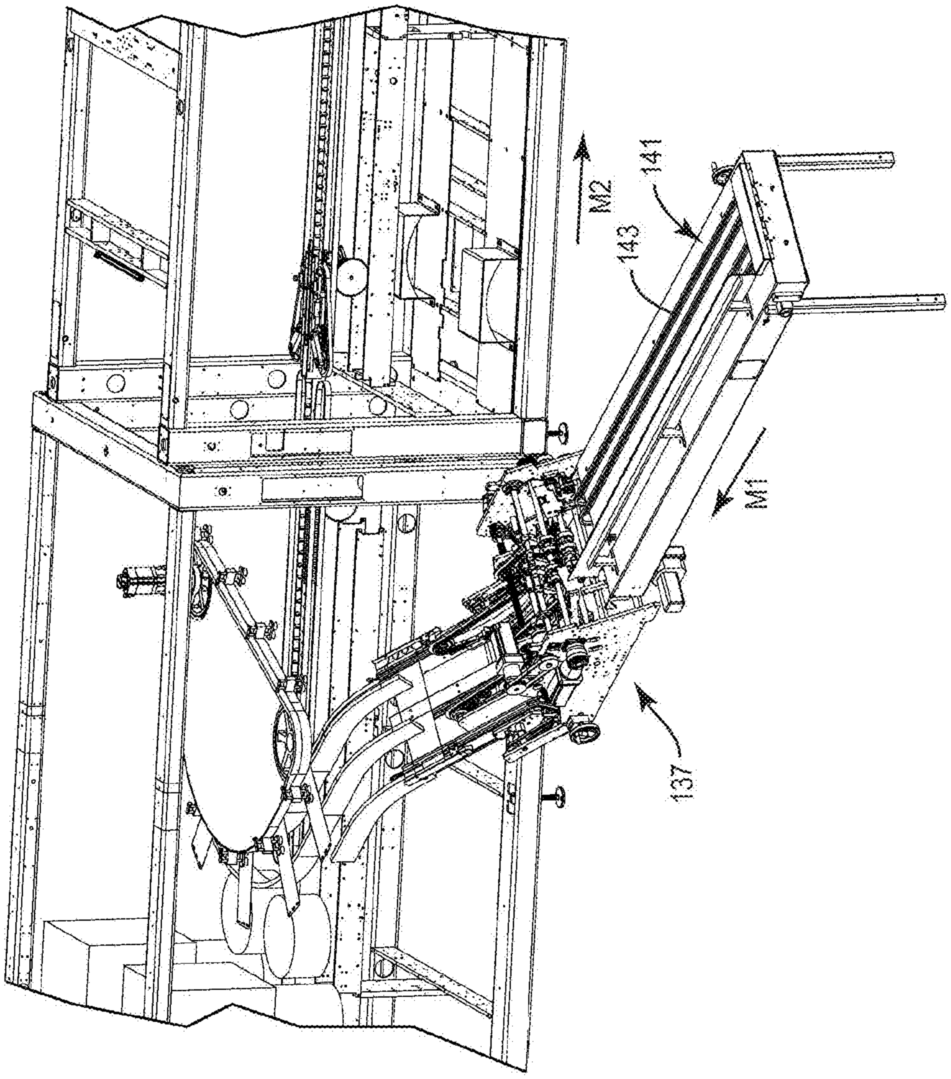
FIG. 7 is an enlarged view of a portion of the system and method of FIG. 1 including a blank feeding assembly.
Figure 8:
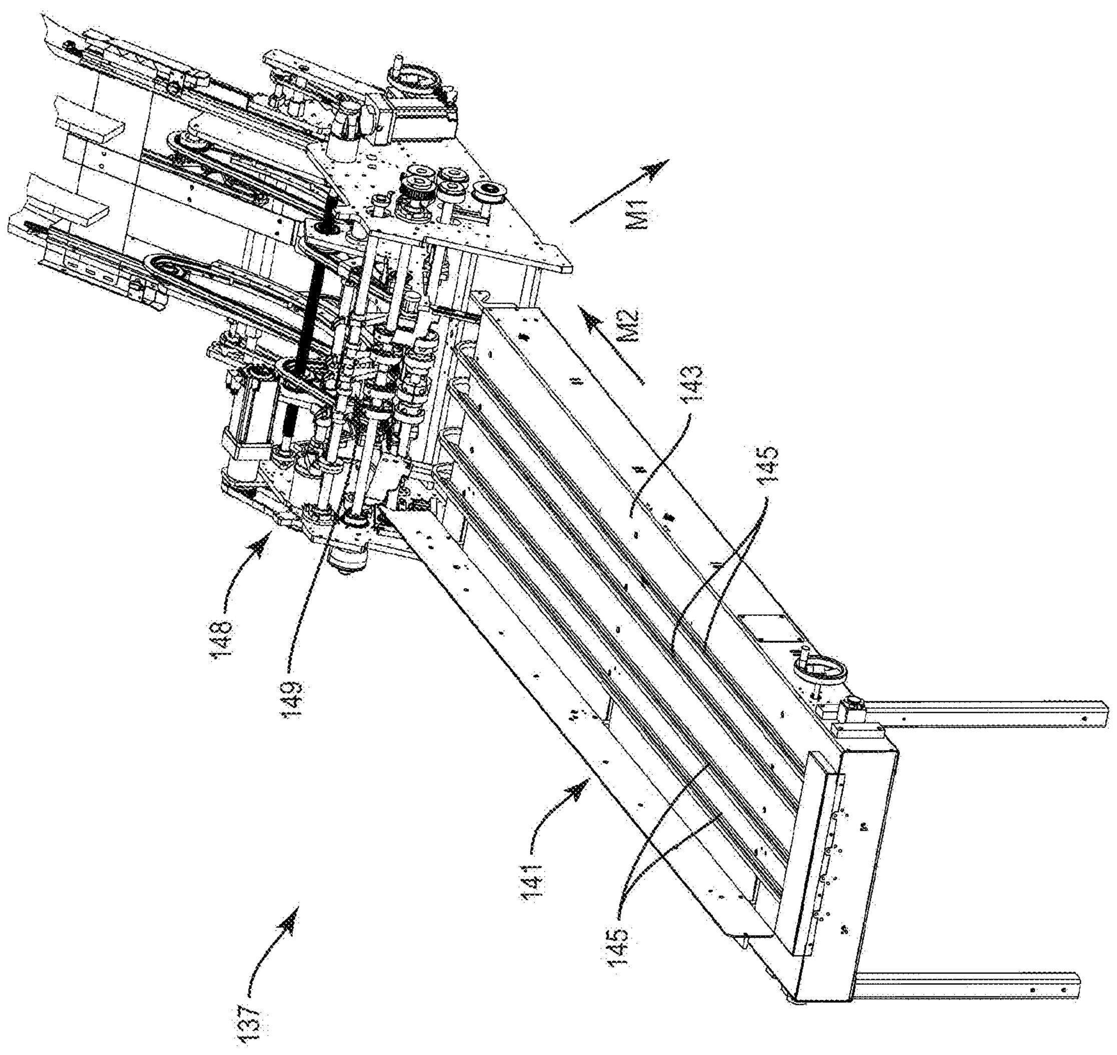
FIG. 8 is a further enlarged view of the portion of the system and method of FIG. 1 including the blank feeding assembly.
Figure 9:
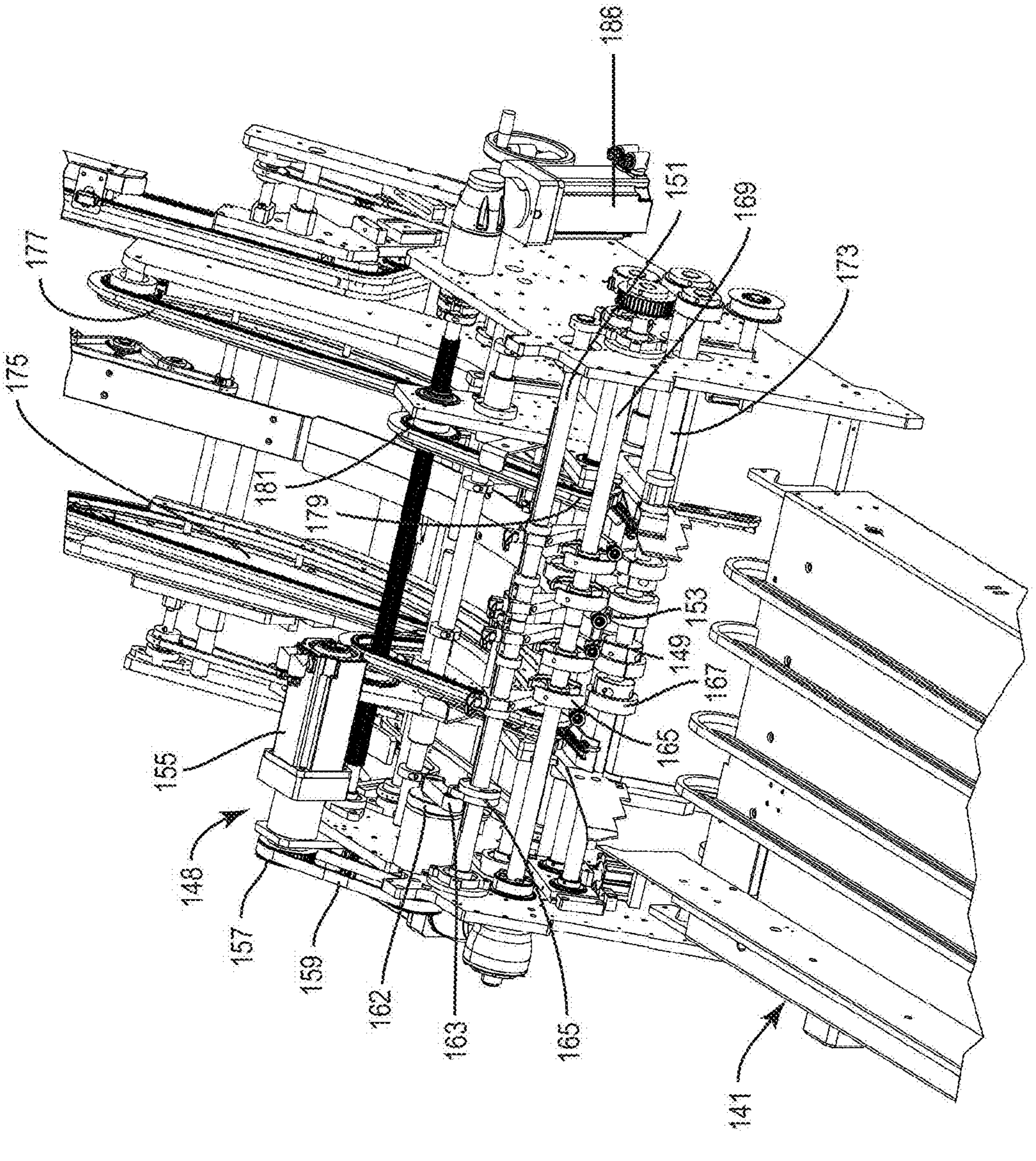
FIG. 9 is an enlarged view of a portion of the blank feeding assembly of the system and method of FIG. 1.
Figure 10:
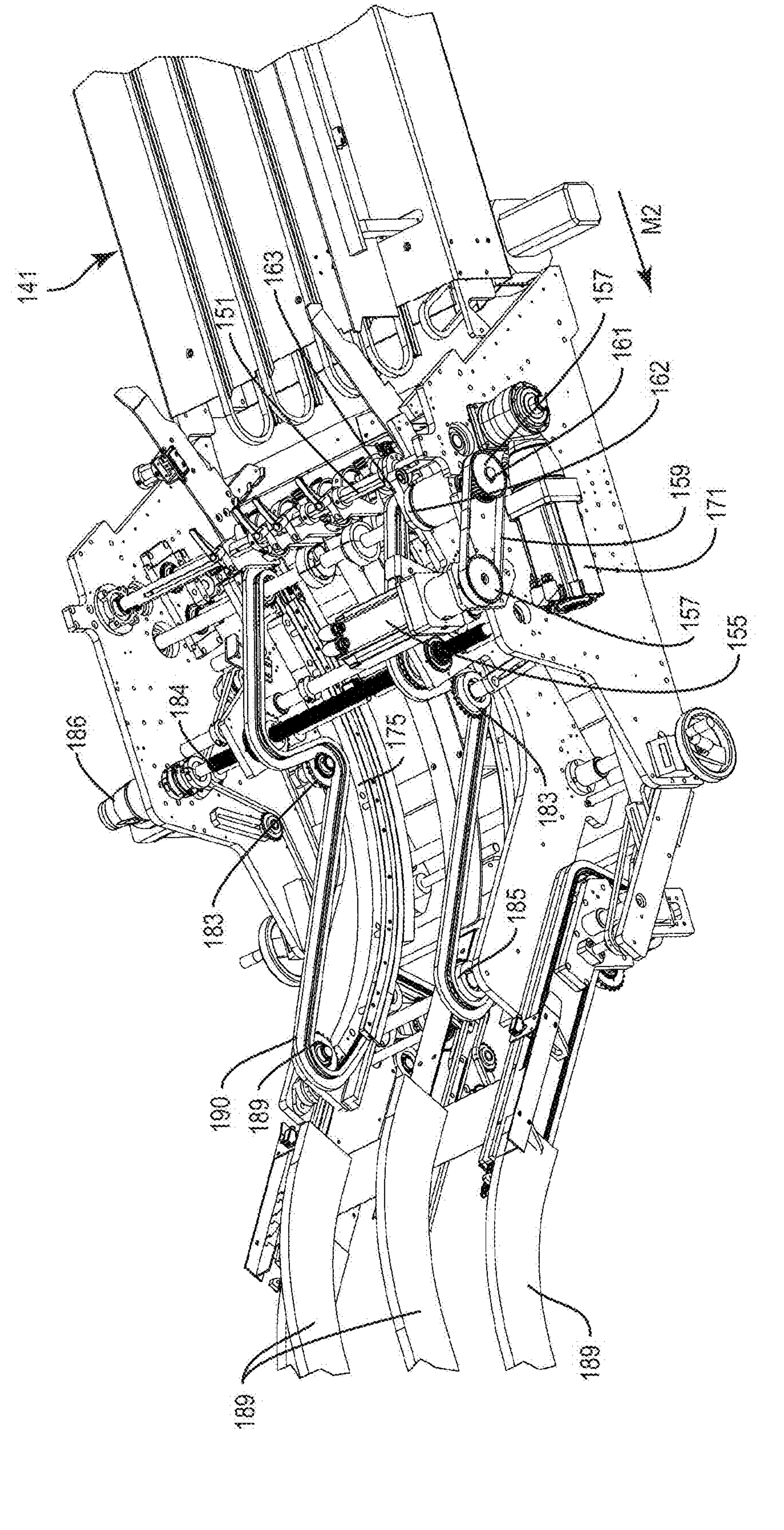
FIG. 10 is another enlarged view of a portion of the blank feeding assembly of the system and method of FIG. 1.
Figure 11:
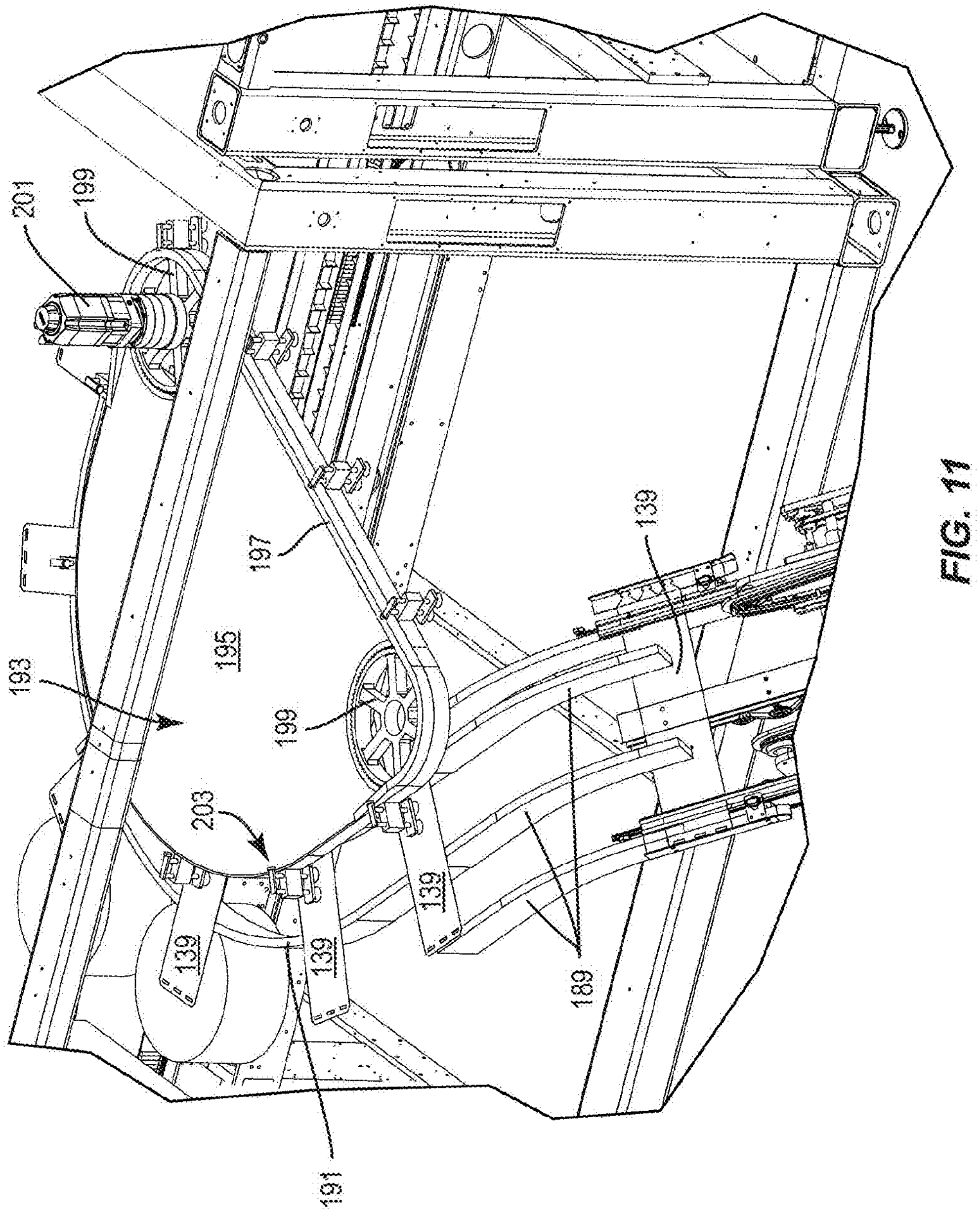
FIG. 11 is an enlarged view of a portion of the system and method of FIG. 1 including a blank turning assembly.

With additional reference to FIG. 6, each product grouping assembly 127, as shown, can include a plurality of sprockets 129 about which a product engaging member 131 is circumferentially disposed. The product engaging member 131 can be an elongate member provided in a looped configuration, e.g., a band, belt, etc., similar to those described herein. In this regard, one or more of the sprockets 129 can be driven, directly or indirectly, by one or more drive assemblies to cause rotation thereof and circumferential movement of the product engaging member 131 thereabout. As shown, the product engaging member 131 can be arranged with a generally linear portion extending parallel to the machine direction M1, such that facing linear portions of the product engaging members 131 of the adjacent product grouping assemblies 127 can be positioned to at least partially receive a product therebetween.

As also shown, each product grouping assembly 127 can include an upper guide 133 and a lower guide 135 in spaced and parallel relation with each other and the machine direction M1. The linear portion of the respective product engaging member 131 can be positioned between the respective upper guide 133 and lower guide 135.

With continued reference to FIGS. 1-6, and with additional reference to FIGS. 7-11, the system 100 includes a blank feeding assembly 137 for inserting one or more blanks 139 into the product packaging system 100 along a path generally parallel and above that of a path along which products move along the product conveyor assembly 103 in the machine direction M1. As described further herein, the blank feeding assembly 137 can provide one or more blanks 139 in registration with one or more products for at least partially forming a product package including a carton or other construct formed form a respective blank 139 and one or more product containers.

As shown, the blank feeding assembly 137 can have a blank conveyor apparatus 141 that includes a bedplate 143 or other support about which a plurality of product engaging members 145 can be looped such that an upper portion of the product engaging members 145 are exposed above the bedplate 143 for contacting a respective blank 139.

The product engaging members 145 can be chains, belts, or other circumferentially disposed members that can be driven, directly or indirectly, by one or more drive assemblies to cause rotation thereof and circumferential movement of the product engaging members 145 about the bedplate 143. In this regard, the product engaging members 145 can be driven to move one or more blanks 139 in a second machine direction M2 (broadly, "first machine direction") at least partially defined by the blank feeding assembly 137 that is offset from the machine direction M1. In some embodiments, the second machine direction M2 can be generally perpendicular to the machine direction M1. In some embodiments, the direction M2 can be obliquely arranged relative to the machine direction M1. In some embodiments, the direction M2 can be generally opposite the machine direction M1.

Positioned downstream, e.g., toward the product conveyor assembly 103, of the blank conveyor apparatus 141, a pick-and-place-style blank feeder apparatus 148 can be provided. As shown best in FIGS. 9 and 10 in the illustrated embodiment, a plurality of blank engagement arms 149 can be mounted on a respective overhead support 151, e.g., a rod, bar, shaft, mounting block, etc., that is at least partially rotatably coupled to a frame or housing of the blank feeder apparatus 148. Each blank engagement arm 149, as shown, can include a respective vacuum cup 153 mounted on a distal end portion thereof. In this regard, in the course of operation of the system 100, the blank engagement arms 149 can be actuated to position the respective cups 153 to engage a respective blank 139 and a vacuum can be applied to the vacuum cups 153 (e.g., via a hose or other fluid line) so that the vacuum cups 153 are configured to acquire engage respective blanks 139 via negative pressure/suction.

As shown, a motor 155 can be coupled to a sprocket 157, and a belt 159 can extend about the sprocket 157 and an associated sprocket 157 such that activation of the motor 155 can drive the sprockets 157 to rotate. The sprocket 157 positioned away from the motor 155 can be fixedly coupled to a driveshaft 161 with an eccentric cam 162 spaced away from an axis of rotation of the driveshaft 161. The eccentric cam 162 can be coupled to the overhead support 151 on which the blank engagement arms 149 are mounted by a crank 163 that is coupled at an opposite end to an eccentric cam 165 fixedly mounted to the overhead support 151, for example, by a keyway. Accordingly, and as described further herein, upon activation of the motor 155, the overhead support 151 and the blank engagement arms 149 mounted thereon can be caused to at least pivot/rotate via the eccentric cams 161, 165 and the crank 163.

With continued reference to FIGS. 1-11, the vacuum cups 153 of the blank engagement arms 149 can be positioned adjacent an upper set of nip rollers 165 and a lower set of nip rollers 167 positioned and arranged for at least partially receiving a respective blank 139 therethrough. The rollers 165 can be fixedly coupled to a driveshaft 169 that can be rotatably driven by a motor 171. In this regard, upon activation of the motor 171, the rollers 165 can be driven to rotate, and, as described further herein, advance a respective blank 139 positioned between the rollers 165, 167 further downstream the blank feeding assembly 137.

In this regard, the rollers 167 can be rotatably mounted to a shaft 173 so as to passively roll as a blank 139 supported thereon is driven by action of the rollers 165. However, it will be understood that, in some embodiments, the shaft 173 and/or rollers 165 can be driven to rotate, for example, by a motor or other actuator.

A pair of at least partially curved lower guide rails 175 extend downstream from the rollers 165, 167, and can extend at least partially upwardly therefrom. As shown, the lower guide rails 175 can be mounted to a support or frame member.

A respective chain 177 can be positioned extending at least partially alongside each lower guide rail 175. The chains 177 can extend in at least partial circumferential engagement with respective sprockets 179, 181, 183, 185, and can be provided in a generally looped configuration, with a lower portion thereof in general registration with the respective lower guide rail 175. As shown, respective sprockets 181 can be fixedly coupled to a driveshaft 184 in mechanical communication with a motor 186 such that the motor 186 can be activated to drive the driveshaft 184 and the sprockets 181 mounted thereon to rotate.

Respective blank engaging members, e.g., lugs, fingers, etc., can be mounted to and arranged extending away from the respective chains 177, such that along a lower path of movement of the respective chains 177, e.g., adjacent the lower guide rails 175, the blank engaging members can be positioned in a generally upright arrangement.

It will be understood that the blank feeder apparatus 148 and/or one or more other portions of the blank infeed assembly 137 can have a different configuration without departing from the disclosure.

A pair of generally curved upper guide rails 189 can be attached to and extend away from the lower guide rails 175, and can extend at least partially upwardly to a pair of turning rails 191 that extend away therefrom.

Figure 12:
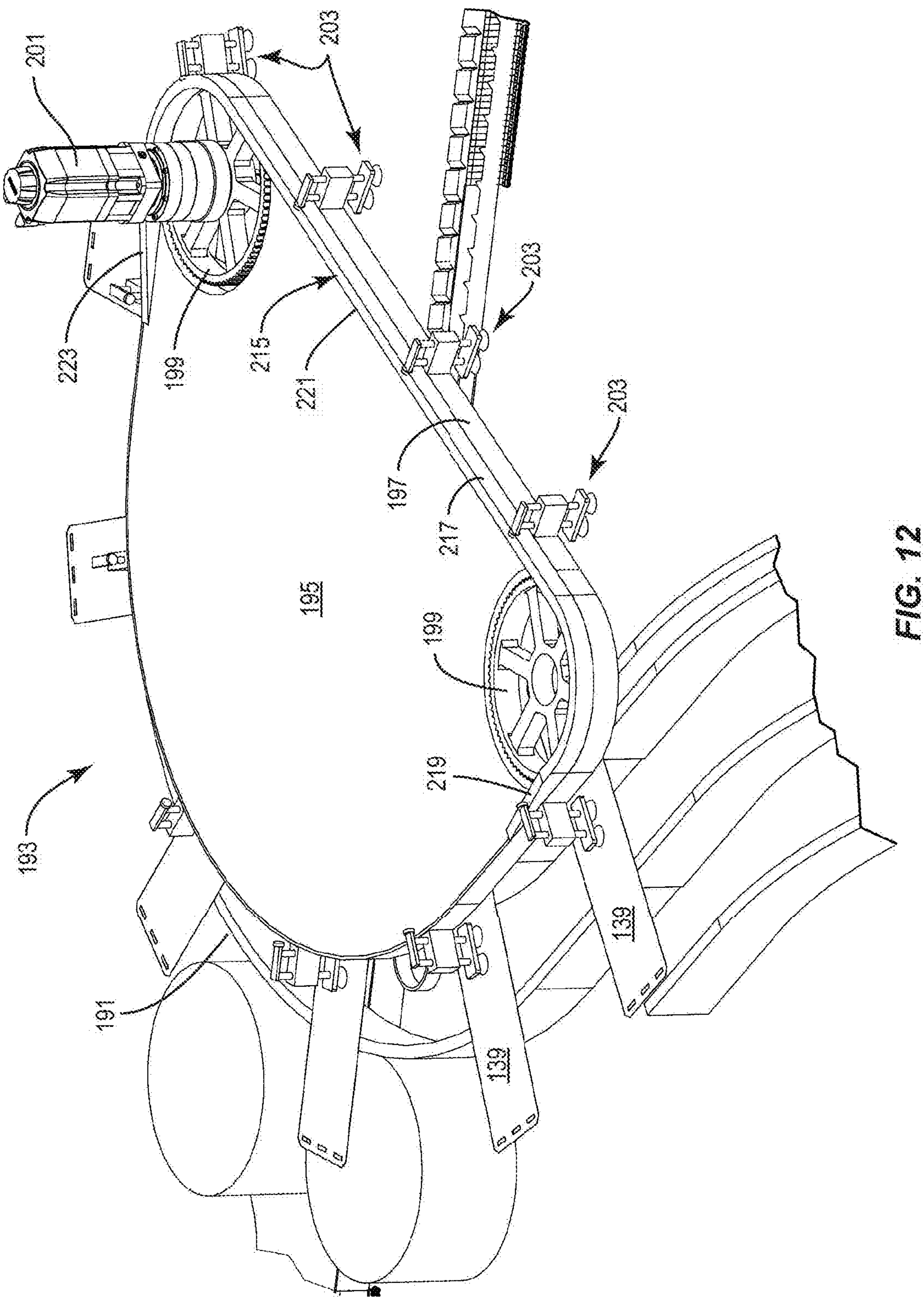
FIG. 12 is an enlarged view of a portion of the blank turning assembly of the system and method of FIG. 1.
Figure 13:
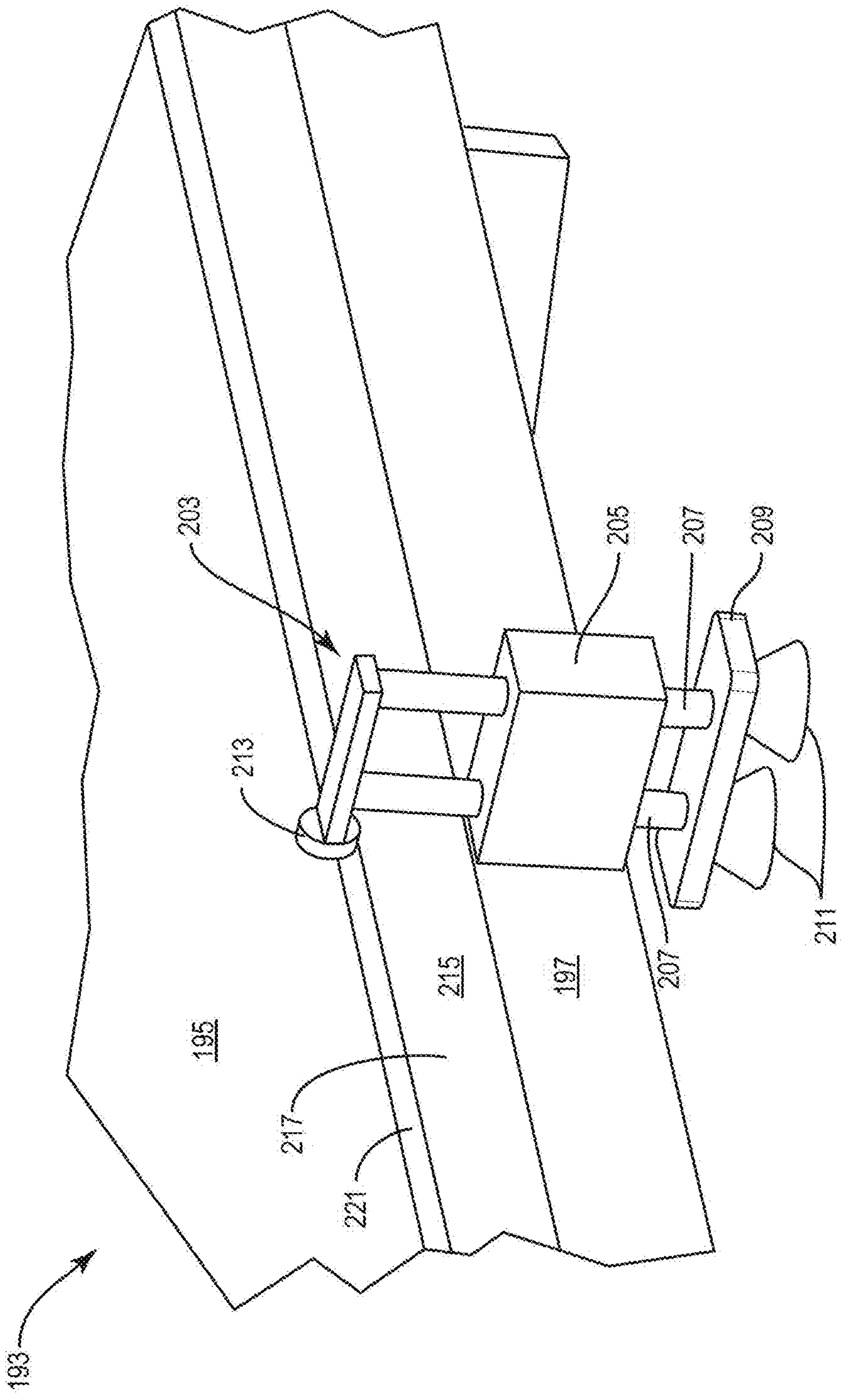
FIG. 13 is another enlarged view of a portion of the blank turning assembly of the system and method of FIG. 1.
Figure 14:
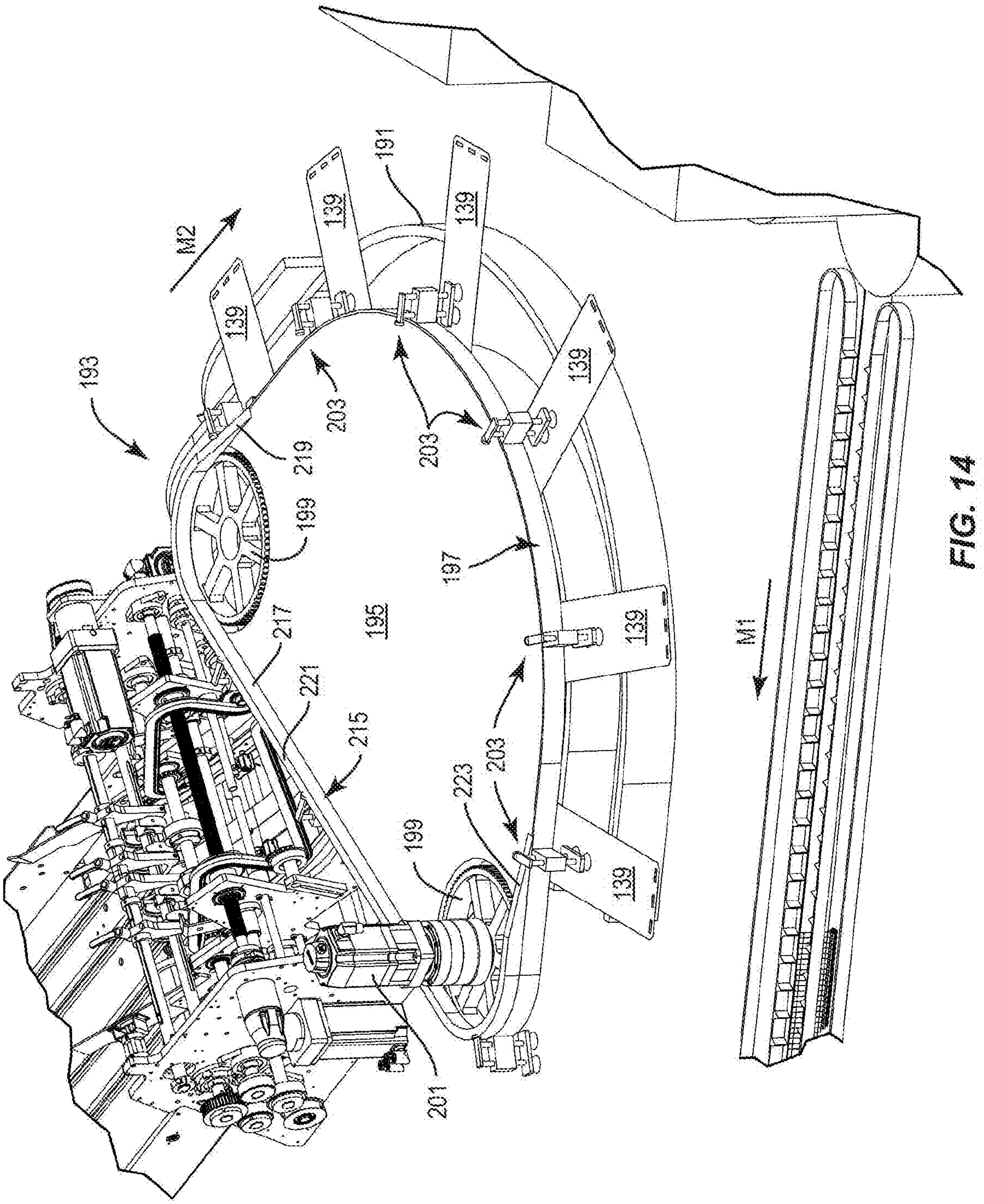
FIG. 14 is an enlarged view of a portion of the system and method of FIG. 1 including the blank turning assembly schematically illustrating an operation thereof.

With particular reference to FIGS. 12-14, in the illustrated embodiment, the turning rails 191 can be at least partially curved members that curve in registration with one another from a path generally parallel with the machine direction toward a path generally parallel with the machine direction M1. As described further herein, the turning rails 191 can be curved to extend such that a distal end portion thereof is aligned above respective products moving along the product conveyor 103 therebelow.

The turning rails 191 can extend at least partially along a blank turning assembly 193 that can be configured to move one or more blanks 139 along the turning rails 191 and into overhead registration with products moving through the product conveyor assembly 103 along the machine direction M1. In some embodiments, the turning rails 191 can extend at least partially around a perimeter of the turning plate 195.

In the illustrated embodiment, the blank turning assembly 193 can include a turning plate 195 about which a blank turning belt 197 can be circumferentially arranged. In this regard, in some embodiments, the turning plate 195 can include a track, groove, recess, etc., for at least partially receiving the blank turning belt 197.

A pair of sprockets 199 can be positioned in planar registration with the blank turning plate 195, as shown, and can be positioned so as to be at least partially exposed along an outside edge of the blank turning plate 195. In the illustrated embodiment, the blank turning plate 195 can include respective recesses for at least partially receiving the sprockets 199 therealong, though a different arrangement of a blank turning plate and sprockets can be provided without departing from the disclosure.

Accordingly, the blank turning belt 197 can be positioned contacting and extending along respective portions of the sprockets 199. At least one of the sprockets 199, as shown, can be in mechanical communication with a motor 201 for driving the respective sprocket 199 to rotate, thereby causing the belt 197 to rotate about the blank turning plate 195, as described further herein.

A plurality of blank engaging assemblies 203 can be coupled to the blank turning belt 197, so as to extend outwardly therefrom and movably supported relative to the turning plate 195. Each blank engaging assembly 203, as shown, can include an attachment block 205 attached to the belt 197 and slidably receiving a pair of rods 207 therethrough. A mounting plate 209 can be attached to a bottom portion of the rods 207 for supporting a pair of blank engaging members 211 thereon. As also shown, a cam follower 213 can be attached to an upper portion of the rods 207, and can extend away therefrom toward the blank turning plate 195.

The blank engaging members 211, as shown, can be generally frustoconical members with a free end surface configured to contact one or more blanks 139 and slidably move them along the turning rails 191, as described further herein. In this regard, the blank engaging members 211 can be comprised of a material and/or have surface patterning suitable for frictional engagement with the surface of a respective blank 139, e.g., a rubber or other polymeric material, grooves, knurls, etc. In some embodiments, the blank engaging members 211 can be treated or coated with a substance to enhance frictional or adhesive contact with the surface of a respective blank 139. It will be understood that one or more portions of the respective blank engaging assemblies 203 can have a different configuration without departing from the disclosure.

As also shown, a cam rail 215 can be mounted to an upper surface of the blank turning plate 195. The cam rail 215 can have a body 217 that includes a first sloped upper surface 219 extending away from an upper surface of the blank turning plate 195 to a generally flat upper surface 221, the flat upper surface 221 extending to a second sloped upper surface 223 that extends downwardly to intersect an upper surface of the blank turning plate 195.

As described further herein, the arrangement of the cam rail 215 can cause the cam followers 213 of the respective blank engaging assemblies 203 to raise upwardly relative to the respective attachment blocks 205 to slidably change the vertical position/height of the respective blank engaging members 211. In some embodiments, the cam rail 215 can be a shaped upper portion of the blank turning plate 195.

With continued reference to FIGS. 1-14, one or more operations of the system 100 with regard to a blank 139 will be described.

One or more blanks 139 can be positioned on the bedplate 143 of the blank conveyor apparatus 141 of the blank feeding assembly 137. In some embodiments, such blank(s) 139 can be loaded into a chute, hopper, magazine, etc., for being serially deposited on a portion of the bedplate 143.

Upon contact with one or more of the product engaging members 145, or a blank engaging structure coupled thereto, the product engaging members 145 can be driven to advance the blank(s) along the bedplate 143 in the machine direction M2.

A vacuum source can be connected in fluid engagement with the vacuum cups 153 of one or more of the blank engagement arms 149 and the motor 155 can be activated to drive the sprockets 157/belt 159 to cause the driveshaft 161 to move the eccentric cam 162 in an eccentric path such that the crank 163 and eccentric cam 165 cooperate to pivot the blank engagement arms 149. In this regard, as a blank 139 approaches the blank feeder apparatus 148, the vacuum cup 153 of one or more blank engagement arm 149 can engage, via suction, the blank 139 and the blank engagement arms 149 can pivot to draw the blank 139 between the nip rollers 165, 167.

Simultaneously or thereafter, the motor 171 can be activated to turn the driveshaft 169 to cause rotation of the nip rollers 165 such that rolling frictional contact of the nip rollers 165 with an upper surface of the blank 139 and passive rolling contact of the nip rollers 167 rotatably mounted therebelow to the shaft 173 influence the blank 139 to move further in the machine direction M2 at least partially onto or in registration with the guide rails 175.

The motor 186 can be driven to cause the respective sprockets 179, 181, 183, 185 and respective chains 177 disposed thereabout to rotate and cause one or more blank engaging members carried thereon to contact a trailing edge of the blank 139 and at least partially slide the blank 139 upwardly/along the guide rails 175 and onto the upper guide rails 189.

Prior to or simultaneously upon approach to the blank turning assembly 193, the motor(s) 201 can be driven to rotate a respective sprocket 199 to cause the blank turning belt 197 to rotate along/about a periphery of the turning plate 195 such that the blank engaging members 203 carried thereon generally follow the path of the turning belt 197, with vertical height adjustment provided by the engagement of the respective cam follower 213 with the cam rail 215.

For example, in some embodiments, the blank turning belt 197 can be generally driven to rotate clockwise when viewed from above or otherwise in a direction following a path from the blank feeding assembly 137 to the blank turning assembly 193.

In this regard, the cam follower 213 of a respective blank engaging assembly 203 can slide and/or roll along the flat upper surface 221 and, on approach toward registration with the turning rails 191, can slide/roll down the first sloped surface 219 such that the rods 207 slide downwardly through respective channels in the attachment block 205 so that the mounting plate 209 and blank engaging members 211 supported thereon are gradually lowered into registration and contact with an upper surface of a respective blank 139. As described herein, the blank engaging members 211 configured for at least partial frictional engagement with the respective blanks 139 such that upon moving contact therewith, the blank 139 is slidably advanced along the path of the turning rails 191.

As the turning rails 191 approach an alignment with a path generally parallel to the machine direction M1, the cam follower 213 of the respective blank engaging assembly 203 can slide/roll upwardly along with second sloped surface 223 of the cam rail 215 so as to slidably raise the rods 207 through the attachment block 205 and the plate 209/blank engaging members 211 carried on the rods 207 upwardly and out of frictional engagement with the blank 139. The respective blank engaging assembly 203 can then be driven to move along the flat upper surface 221 of the cam rail 215 toward a return position along the blank turning assembly 193 for engagement with a subsequent blank 139.

Meanwhile, the blank 139 exiting the turning rails 191 can be carried/positioned for further downstream operations of the system 100. For example, a respective blank 139 can be positioned for alignment over a portion of the product conveyor assembly to at least partially receive and/or engage, e.g., via wrapping or other enclosing relation, one or more products carried by the conveyor assembly 103.

In this regard, the conveyor assembly 103 can be activated to move one or more products in the machine direction M1 prior to, simultaneously with, and/or subsequent to operation of the blank feeding assembly 137 and/or blank turning assembly 193 described above. For example, in some embodiments, the one or more drive assemblies 113 of the product conveyor assembly 103 can be activated to drive one or more of the respective sprockets 111 to move the belt(s) 109 disposed thereabout to carry the blank engaging members 115 carried thereupon in the machine direction M1 to contact and move one or more products along the product engagement assembly 103.

Respective products moving along the product conveyor assembly 103 can also become disposed in respective product recesses along the metering belts 117 as products move in the machine direction M1. In some embodiments, the product grouping assemblies 127 can be driven, for example, via one or more motors operatively connected to one or more respective sprockets 129, to cause the respective product engaging member 131 to contact and advance a respective product through the respective guide rails 133, 135 into a desired product arrangement along the product conveyor assembly 103.

In this regard, products moving in the machine direction M1 via the product engagement assembly 103 can be advanced toward a registration point with a respective blank 139 exiting the blank turning assembly 193 for engagement, e.g., such that one or more product containers can be paired with a respective blank 139 and/or carton/carrier at least partially formed therefrom to provide product packages.

In view of the foregoing, the system 100 is configured to advance one or more containers in a machine direction M1 on a product conveyor assembly 103 and to advance one or more blanks 139 from a blank feeding assembly 137 into registration with the one or more containers from a machine direction M2 that is offset, e.g., obliquely or perpendicularly disposed with respect to the machine direction M1 (for example, at an angle greater than 0 degrees and up to and including 90 degrees), via a blank turning assembly 193 that can move the blank 139 along an at least partially curved and/or angled path between the blank feeding assembly 137 and the product conveyor assembly 103.

The configuration of the blank turning assembly 193 can thus allow for selection of the orientation of the blank feeding assembly 137 and, thus, the machine direction M2 at least partially defined thereby, such that the footprint of the system 100 can be selectively reconfigured, for example, for space-saving considerations, to meet building or operational constraints, etc.

Figure 15:
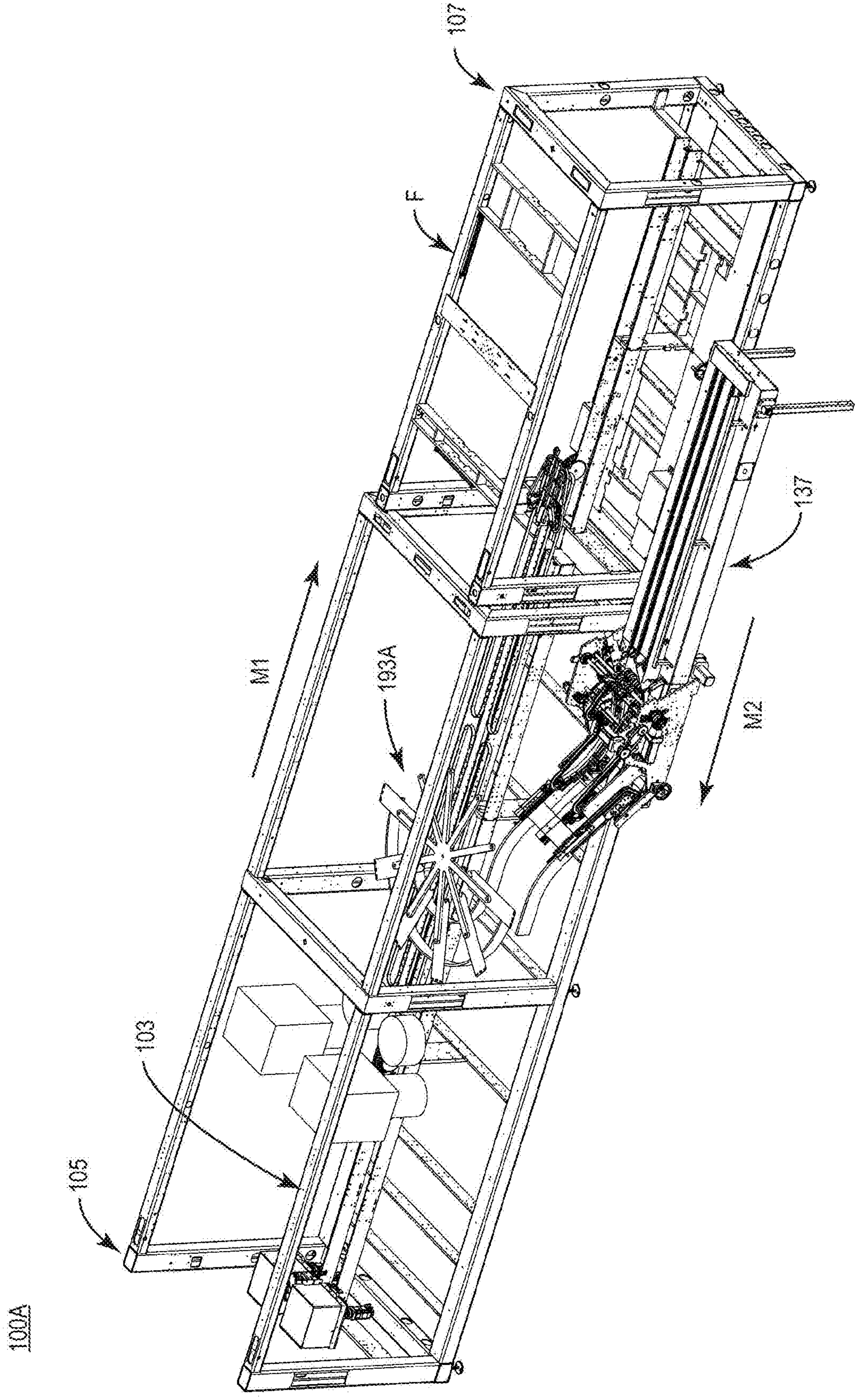
FIG. 15 is a perspective view of a system and method including a blank turning assembly according to an alternative exemplary embodiment of the disclosure.
Figure 16:
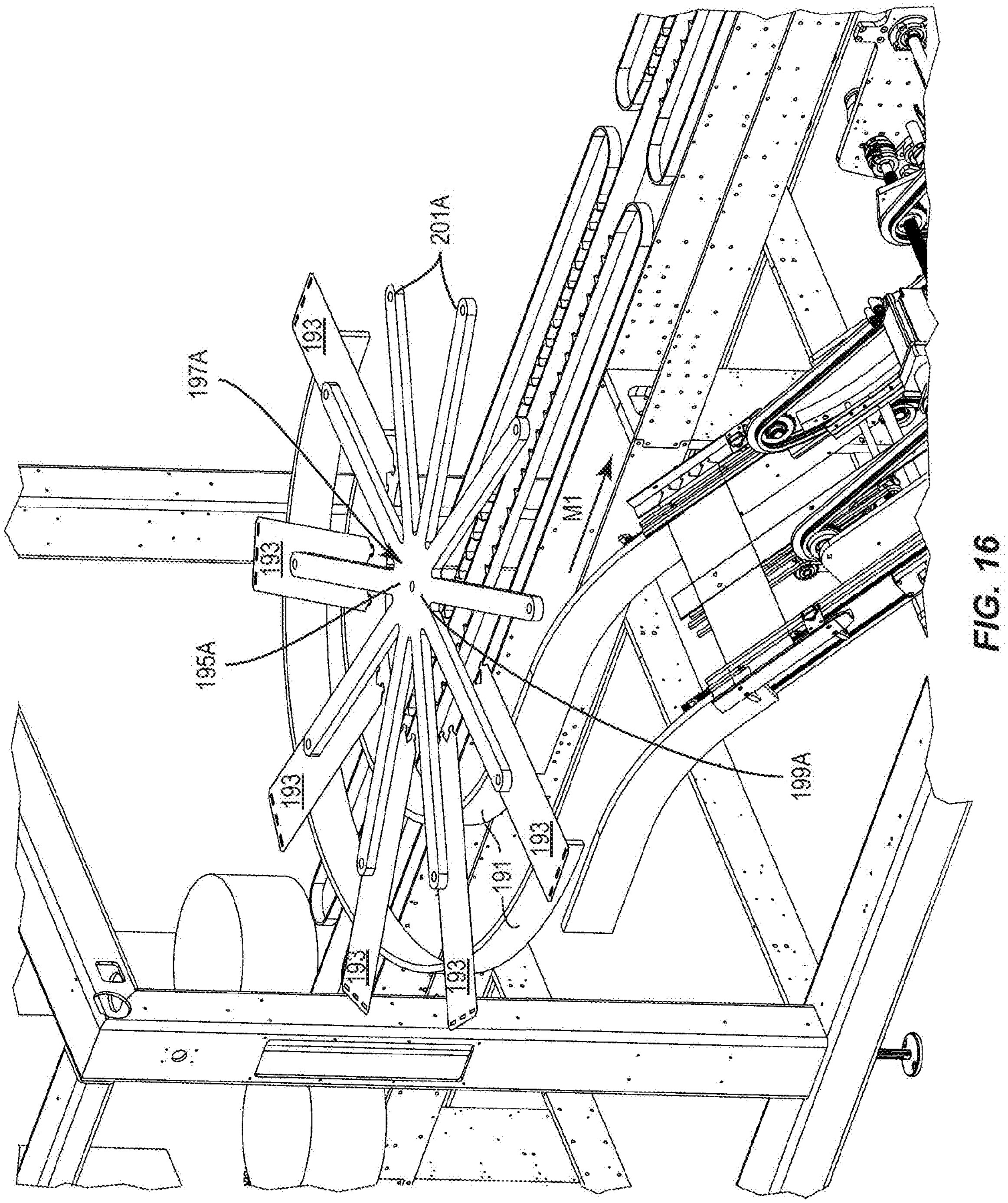
FIG. 16 is an enlarged view of a portion of the system and method of FIG. 15 including a blank turning assembly.

With additional reference to FIGS. 15 and 16, a system 100A is illustrated according to an alternative exemplary embodiment of the disclosure. The system 100A can be generally similar to the system 100 described above, and like or similar components are designated with like or similar reference numerals. For example, the system 100A can have the machine direction M1 and the machine direction M2, the blank feeding assembly 137, and the product conveyor assembly 103.

In the illustrated embodiment, the machine direction M2 can be offset from the machine direction M1 about 180 degrees, e.g., such that the directions M1, M2 are opposite one another along the system 100A.

Further, the system 100A can include a blank turning assembly 193A that includes a blank turning hub 195A that can be rotatably mounted to a portion of the system 100A, and can be configured to contact and slide one or more blanks 139 along the turning rails 191 toward an alignment with the machine direction M1 in the manner described above with regard to the system 100.

Accordingly, the blank turning hub 195A can include a body 197A with a central portion 199A rotatably mounted to a portion of the system 100A for being driven by a suitable actuator, e.g., motor or other prime mover, either directly or indirectly with one or more intermediate transmissions. A plurality of spokes 201A of the body 197A of the blank turning hub 195A can extend from the central portion 199A a sufficient distance to at least partially overlie a respective blank 139 positioned on the turning tails 191. In this regard, the spokes 201A, either directly or via an intermediate contacting structure supported on the respective spokes 201A, can be positioned for contact with a respective blank 139 to cause the blank 139 to slide along the turning rails 191 when the blank turning hub 195A is driven to rotate.

In this regard, the system 100A can have a configuration and operation generally similar to that described above with respect to the system 100, with similar advantages.

It will be understood that one or more components of the systems 100, 100A can have a different configuration, position, arrangement, etc., without departing from the disclosure.

In general, the blanks/constructs according to the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of moving a blank in a product packaging system, the method comprising:

positioning the blank on a blank feeding assembly, the blank feeding assembly defining a first machine direction;

advancing the blank from the blank feeding assembly toward a product conveyor assembly configured to move at least one product in a second machine direction, the second machine direction offset from the first machine direction; and moving the blank along a blank turning assembly, the blank turning assembly comprising a plurality of turning rails following at least one of a curved path and an angled path between the blank feeding assembly and the product conveyor assembly, the blank turning assembly comprises a turning plate and moving the blank along the blank turning assembly comprises contacting the blank with a blank engaging assembly movably supported along the turning plate.

2. The method of claim 1, wherein moving the blank along the blank turning assembly comprises moving the blank from a path along the first machine direction to a path along the second machine direction for being in registration with at least one product of the plurality of products.

3. The method of claim 2, wherein the second machine direction is perpendicularly or obliquely disposed relative to the first machine direction.

4. The method of claim 2, wherein the second direction is at an angle of about 180 degrees relative to the first machine direction.

5. The method of claim 1, wherein the plurality of turning rails extends at least partially around a perimeter of the turning plate.

6. The method of claim 5, wherein the blank engaging assembly is coupled to a blank turning belt, and the method comprises at least partially moving the blank turning belt along the turning plate.

7. The method of claim 6, wherein the blank engaging assembly comprises a cam follower coupled to a least one rod supporting a blank engaging member.

8. The method of claim 7, wherein a cam rail extends upwardly from the turning plate, and the method comprises moving the cam follower of the blank engaging assembly along a sloped surface of the cam rail to adjust a vertical height of the blank engaging member.

9. A product packaging system, the system comprising:

a blank feeding assembly defining a first machine direction;

a product conveyor assembly configured to move at least one product in a second machine direction, the second machine direction offset from the first machine direction; and a blank turning assembly, the blank turning assembly comprising a plurality of turning rails for supporting a blank and following at least one of a curved path and an angled path between the blank feeding assembly and the product conveyor assembly for moving a blank from a path along the first machine direction to a path along the second machine direction, the blank turning assembly comprises a turning plate and a blank engaging assembly movably supported along the turning plate.

10. The product packaging system of claim 9, wherein the second machine direction is perpendicularly or obliquely disposed relative to the first machine direction.

11. The product packaging system of claim 9, wherein the second direction is at an angle of about 180 degrees relative to the first machine direction.

12. The product packaging system of claim 9, wherein the plurality of turning rails extends at least partially around a perimeter of the turning plate.

13. The product packaging system of claim 12, wherein the blank engaging assembly is coupled to a blank turning belt movably coupled to the turning plate.

14. The product packaging system of claim 13, wherein the blank engaging assembly comprises a cam follower coupled to a least one rod supporting a blank engaging member.

15. The product packaging system of claim 14, wherein the blank turning assembly comprises a cam rail extending upwardly from the turning plate and the cam follower of the blank engaging assembly is movably supported along the cam rail, the cam rail comprising a sloped surface of the cam rail for adjusting a vertical height of the blank engaging member.

16. A blank turning assembly for a product packaging system, the blank turning assembly comprising:

a plurality of turning rails following at least one of a curved path and an angled path, the plurality of turning rails being for being positioned between a blank feeding assembly defining a first machine direction and a product conveyor assembly defining a second machine direction offset from the first machine direction such that the plurality of turning rails are for supporting and moving a blank from a path along the first machine direction to a path along the second machine direction; and a turning plate and a blank engaging assembly movably supported along the turning plate.

17. The blank turning assembly of claim 16, wherein the second machine direction is perpendicularly or obliquely disposed relative to the first machine direction.

18. The blank turning assembly of claim 16, wherein the second direction is at an angle of about 180 degrees relative to the first machine direction.

19. The blank turning assembly of claim 16, wherein the plurality of turning rails extends at least partially around a perimeter of the turning plate.

20. The blank turning assembly of claim 19, wherein the blank engaging assembly is coupled to a blank turning belt movably coupled to the turning plate.

21. The blank turning assembly of claim 20, wherein the blank engaging assembly comprises a cam follower coupled to a least one rod supporting a blank engaging member.

22. The blank turning assembly of claim 21, further comprising a cam rail extending upwardly from the turning plate, the cam follower of the blank engaging assembly movably supported along the cam rail, the cam rail comprising a sloped surface of the cam rail for adjusting a vertical height of the blank engaging member.

23. A blank turning assembly for a product packaging system, the blank turning assembly comprising:

a plurality of turning rails following at least one of a curved path and an angled path, the plurality of turning rails being for being positioned between a blank feeding assembly conveying blanks in a first machine direction and a product conveyor assembly conveying products in a second machine direction offset from the first machine direction such that the plurality of turning rails are for supporting and moving a blank from a path along the first machine direction to a path along the second machine direction; and a turning plate, a blank turning belt operatively connected to the turning plate and extending around the periphery of the turning plate, and a blank engaging assembly connected to the blank turning belt and having a blank engagement member for engaging the blank and moving the blank with the blank turning belt.

* * * * *